Sept. 9, 1941.　　　F. D. JONES ET AL　　　2,255,288
RAKE
Filed Jan. 16, 1939　　　2 Sheets-Sheet 1

INVENTOR.
FRANK D. JONES. &
MARCUS E. MC CLELLAN.
BY
ATTORNEYS

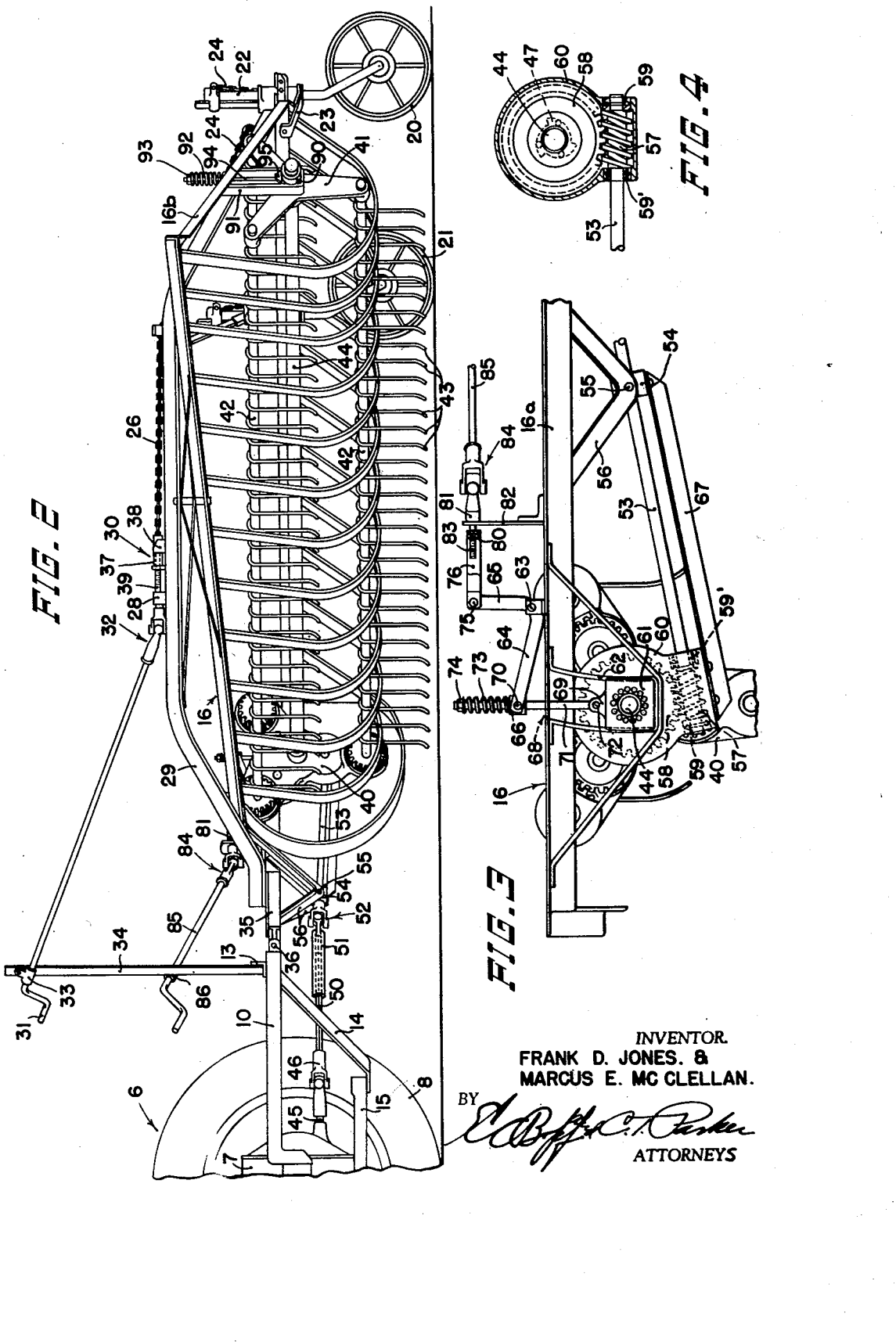

Patented Sept. 9, 1941

2,255,288

UNITED STATES PATENT OFFICE 2,255,288

RAKE

Frank D. Jones and Marcus E. McClellan, Ottumwa, Iowa, assignors to Dain Manufacturing Company of Iowa, Ottumwa, Iowa, a corporation of Iowa Application January 16, 1939, Serial No. 251,170

10 Claims. (Cl. 56—27)

The present invention relates to side delivery rakes and is more particularly concerned with a rake of the type adapted to be supported in part on a propelling tractor and having a rotary rake reel driven from the tractor power take-off shaft.

The principal object of the present invention is to provide a new and improved side delivery rake that is adapted to operate satisfactorily under widely varying field conditions and is particularly suited to difficult and irregular terrain. In the accomplishment of this object we have provided a floating support for the rake reel whereby the latter is enabled to yield upwardly if the rake teeth strike the ground, and thereby avoid damage to the rake teeth, reel shaft, or implement frame.

More specifically, it is an object of the present invention to provide a side delivery rake having a rotary rake reel carried by a spring suspension device on the supporting frame, and driving means on the reel shaft operatively connected with the power take-off shaft of the propelling tractor for rotating the rake reel.

Another object is to provide an over-running clutch in the driving mechanism between the tractor power take-off shaft and the reel shaft whereby the latter is allowed to over-run the power take-off shaft if the engine is suddenly throttled down and thus prevent damage to the driving mechanism from the momentum force of the reel.

Still another object is to provide an improved self-equalizing lifting device for raising the rear end of the rake frame on the usual two caster wheels so that each of the two caster wheels bears an equal portion of the weight of the implement at all times.

These and other objects and advantages of the present invention will become apparent after a consideration of the following detailed description of a preferred embodiment thereof, reference being had to the accompanying drawings, in which Figure 1 is a plan view of a tractor mounted side delivery rake embodying the principles of our invention;

Figure 2 is a side elevation of the same machine, the near tractor driving wheel being removed to show certain details of the invention more clearly;

Figure 3 is an enlarged detail view showing the spring suspension of the front or inner end of the reel on the supporting frame, and the driving unit on the reel shaft; and Figure 4 is a sectional view taken along a line 4—4 in Figure 1 and showing the gears and overrunning clutch.

Figure 1:
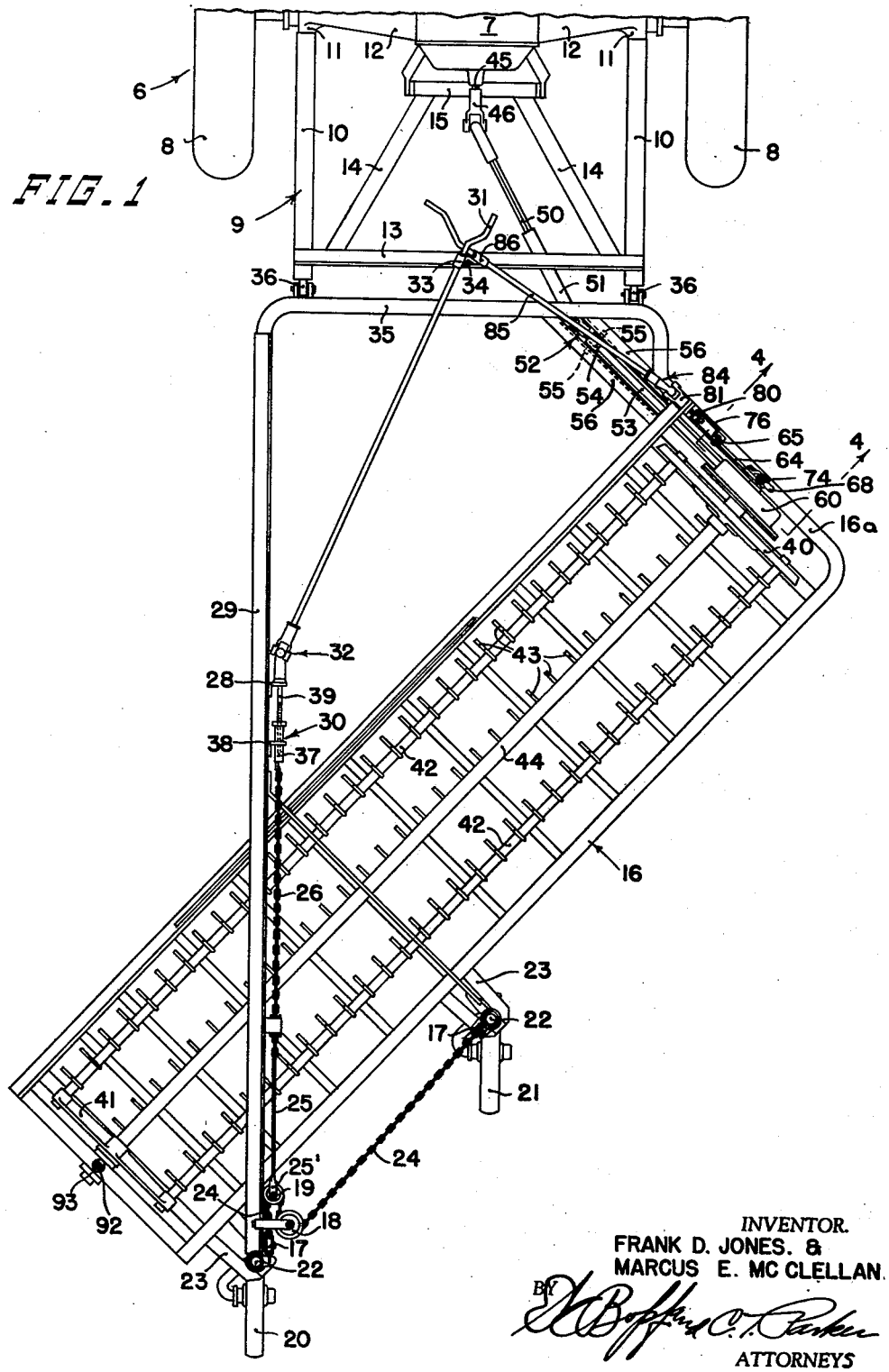

Referring now to the drawings, the reference numeral 6 indicates a tractor having a body 7 which is supported on rear driving wheels 8. Mounted on the tractor body is a draft frame 9 comprising a pair of laterally spaced members 10 which are bolted to mounting bosses 11 on the tractor rear axle housing 12 and extend rearwardly therefrom. The rear ends of the members 10 are rigidly connected by a cross member 13, and the draft frame is braced by members 14 which are fixed to the tractor drawbar 15 and extend rearwardly and upwardly therefrom in diverging relation and are fixed to the cross member 13.

A diagonally disposed reel frame 16 is pivotally supported at its front end on the draft frame 9 and is carried at its rear end on a pair of laterally spaced rear caster wheels 20 and 21. The caster wheels 20, 21 are each journaled on the lower end of a vertical standard 22 that is slidably engaged in a bearing member carried by a bracket 23 secured to and projecting rearwardly from the frame 16. The rear end of the reel frame 16 may be raised or lowered relative to the caster wheels 20, 21 for adjusting the rake to the proper height above the ground, and this is accomplished through an adjusting device 30 and suitable equalizing connecting means. Preferably, the adjusting device 30 is mounted on the long truss bar 29 extending forwardly from the caster wheel 20, and consists of a nut 37 and screw member 39 in threaded engagement therewith. The nut 37 is held against rotation by a suitable bracket member 38 on the truss bar 29, while the screw member 39 is rotatably supported in a bearing bracket 28 and is operatively connected by a universal joint 32 to a hand crank 31 disposed within convenient reach of the operator at his station on the tractor. The shaft of the crank 31 is journaled within a bearing sleeve 33 through which it is also slidable longitudinally and the latter is swiveled on a supporting angle iron 34 which is fixed to the draft frame cross member 13. A chain 26 is connected at one end to the nut 37 and at the other end to a link 25 having a bifurcated yoke portion 25' in which an equalizing sheave wheel 19 is journaled. A chain 24 is suitably fastened to the upper ends of the standards 22 and is trained over rollers 17 and 18, as well as over the equalizing sheave wheel 19 so that the pull exerted by the adjusting device 30 is transmitted equally to both standards 22, forcing the latter downwardly and thereby raising the frame 16.

In the construction shown, the reel frame 16 is connected to the draft frame 9 by means of a bent supplemental frame member 35 that is rigidly connected with and forms an extension of the main frame 16. The supplemental frame member 35 is pivotally connected to the ends of the draft frame members 10 for vertical swinging by a pair of spaced hinges 36, and when the reel frame 16 is adjusted vertically with reference to the caster wheels 20, 21, the frame rocks about the axis of the hinges.

Rotatably mounted in the reel frame 16 is the reel comprising an inner or forward head 40 and an outer or rearward head 41 which are connected together by a plurality of bars 42, preferably three as shown, that carry rake teeth 43.

The heads 40 and 41 are secured upon a central shaft 44, and it is by the rotation of this shaft that the reel as a whole is driven. The power for driving the reel is derived from the power take-off shaft 45 which projects rearwardly from the tractor body 7 and is transmitted by the following mechanism. A universal joint connection 46 is adapted to be fixedly secured to the power take-off shaft 45 and drives a shaft 50 which extends laterally rearwardly in the direction of the inner reel head 40. At its rear end, the shaft 50 is connected by a telescopic joint 51 and universal joint 52 with a second drive shaft 53 which is rotatably supported at its front end in a swiveled bearing sleeve 54, and is also slidable longitudinally therein. The bearing sleeve 54 is provided with horizontal trunnions 55 which are journaled in two V-shaped supporting hangers 56 attached to and extending between the supplemental frame member 35 and the reel frame 16. The rear end of the shaft 53 enters a gear case 60 and is rotatably supported therein by suitable bearing means. The gear case 60 is rotatably supported on the central shaft 44 adjacent the inner head 40, and the shaft 53 is operatively connected with the shaft 44 by suitable gear driving means, preferably in the form of a worm 57 fixed on the end of the shaft 53 and meshed with a worm gear 58 on the shaft 44 and connected to drive the latter through an overrunning clutch mechanism 47, the purpose of which is to prevent sudden strains being applied to the reel when the power take-off shaft 45 is declutched or the engine throttled down. It will thus be seen that the shaft 44 is rotated by power derived from the tractor power take-off shaft 45 through the driving mechanism just described. An angle iron torsional member 67 is fixedly secured to and extends between the under side of the gear case 60 and the bearing sleeve 54 to hold the gear case in fixed relation to the pivot 55 and to resist the tendency of the gear case to rotate counter to the reel shaft 44, thereby relieving the drive shaft 53 of any bending stresses.

The rake reel is supported on the reel frame 16 by a vertically adjustable spring suspension device of the type shown and described in Letters Patent No. 1,914,036, granted to H. Moschel on June 13, 1933, and reference may be had to this patent for details of construction and operation. Briefly, the forward end of the central shaft 44 of the reel is journaled in a bearing block 61 (see Figure 3) provided with vertically extending grooves on opposite sides for receiving the side members of a U-shaped supporting member 62 depending downwardly from the transverse cross bar 16a of the reel frame 16 to which it is rigidly secured in any suitable manner, the support thus forming a guide for said bearing block in its vertical movement as hereinafter described. Both side members of the supporting guide 62 and the cooperating vertical grooves in the bearing block 61 are made arcuate about the pivot 55 so that the distance between the axes of the reel shaft 44 and the trunnions 55 is maintained constant for any position of the block 61 in the guide 62, allowing the gear case 60 and torsional member 67 to swing freely about the pivot 55. A bell crank is pivotally mounted at 63 on the bar 16a of the frame and comprises a laterally extending arm 64 and a vertically extending arm 65, said lateral arm being bifurcated at its outer end to receive a sleeve 66 therebetween. The sleeve 66 has horizontal trunnions 70 that are journaled in the arm 64, and slidably embraces a rod 71 that extends through a slot 68 in the horizontal flange of the frame bar 16a and is pivotally connected at its lower end by a pin 72 to a lug 69 provided on the bearing block 61. The bearing block 61 is supported on the arm 64 by a compression spring 73 which encircles the rod 71, the latter having a nut 74 carried on the spring, which bears downwardly against the top of the sleeve 66.

The vertical arm 65 of the bell crank is pivotally connected by a pin 75 to a yoke 76 and the latter is provided with spaced side members adapted to receive between them a nut 80 and to hold the said nut against rotation. An adjusting member 81 is rotatably supported in a vertical member 82 that is fixed to the frame cross member 16a, and the end of the adjusting member 81 passes through an aperture in the end of the yoke 76 and is threaded, as at 83, so as to engage the nut 80. The adjusting member 81 is connected by a universal joint 84 with a hand crank 85 which extends forwardly to within convenient reach of the operator, and the crank is rotatably supported and slidable within a bearing sleeve 86 swiveled on the post 34. This adjusting mechanism is provided for the forward end portion of the reel for the purpose of leveling the reel.

The rear end of the shaft 44 is similarly yieldingly suspended from the inclined transverse frame member 16b at the rear end of the frame 16, and is journaled in a bearing block 90. The latter is provided with vertically extending grooves on opposite sides for receiving the side members of a U-shaped supporting member 91 suitably secured at its upper end to the frame member 16b. The bearing block 90 is supported on a compression spring 92 which bears downwardly against the frame member 16b and reacts upwardly against a nut 93 threaded on the upper end of a rod 94, the lower end of said rod being pivotally connected at 95 to the bearing block 90.

The reel is leveled by raising or lowering either end thereof relative to the frame 16, and this is accomplished by proper adjustment of the member 81 through the hand crank 85, or by turning the nut 93 up or down on the threaded end of the rod 94. By turning the crank 85, the lateral arm 64 of the bell crank may be swung upwardly, raising the bearing block 61 on the compressed spring 73, and with it, the forward end of the reel shaft 44. Likewise, the rear end of the reel may be raised on the spring 92 by turning the nut 93 down on the rod 94 to compress the spring sufficiently to carry the weight of the reel journaled in the bearing block 90.

In the drawings I have illustrated the relative positions of the parts when the central shaft 44 of the reel is in its normal or lowermost position with the bearing blocks 61 and 90 resting on the lower ends of their U-shaped supporting members 62 and 91 and the springs by which these blocks are suspended are compressed. When traveling over level ground the parts will remain approximately in the position shown, but if the tractor wheels 8 or the rear caster wheels 20, 21 should drop into a sudden depression and the rake teeth should strike the ground, the reel would be permitted to rise relative to the reel frame by the upward sliding of the bearing blocks in their respective guides, aided somewhat by the stressed springs 73 and 92, and the wheels would remain in contact with the ground, supporting the considerably greater weight of the frame and thereby minimizing the possibility of damaging the rake reel or teeth.

It will be seen that as the front end of the reel rises and falls in the manner just described, the drive shaft 53 will pivot about the bearing sleeve trunnions 55, and the slight amount of longitudinal movement of the shaft 53 through the sleeve 54 will be accommodated by the telescopic joint 51. Also, the shaft 53 and bearing sleeve 54 act to hold the gear case against rotation about the shaft 44 at all times, since the reaction of the gear case is in a counter-clockwise direction is viewed in Figure 3.

What we claim as our invention is:

1. In a rake of the class described, the combination of a wheel supported frame, a rotatable rake reel having a central shaft, means yieldingly suspending said shaft from said frame for vertical movement relative thereto, and means for rotating said reel comprising a drive shaft having operating connection with said central shaft, a bearing member pivotally connected with said frame for swinging about a substantially horizontal axis, said drive shaft being rotatably supported in said bearing member, and means movable vertically with said central shaft for maintaining the drive shaft and central shaft in operating relation with one another.

2. In combination with a tractor having a body and a power take-off shaft projecting outwardly therefrom, a side delivery rake comprising a frame supported at least in part on said tractor body, a rotary rake reel, vertically yieldable means suspending said rake reel from said frame, power transmission means operatively connected with said rake reel and movable vertically therewith, and flexible driving means connecting said power take-off shaft with said power transmission means.

3. In combination with a tractor having a body and a power take-off shaft projecting outwardly therefrom, a side delivery rake comprising a draft frame rigidly mounted on said tractor body, a main frame pivotally connected with said draft frame for vertical swinging, a rotary rake reel mounted on a central shaft, means yieldingly suspending said shaft from said main frame, and means for rotating said rake reel comprising a drive shaft, a bearing mounted on said main frame for swinging about a horizontal axis and adapted for rotatably supporting said drive shaft, means for holding said drive shaft in fixed relation with said central shaft, driving connection between said drive shaft and said central shaft, and means operatively connecting said drive shaft with said power take-off shaft at a point adjacent said bearing.

4. A tractor operated side delivery rake comprising a frame, draft means connecting the frame with the tractor, a reel shaft supported on said frame for vertical movement relative thereto, a rake reel fixed to said shaft and driven thereby, a housing journaled on said shaft and movable vertically therewith, a drive shaft rotatably supported in said housing, driving connection between said drive shaft and said reel shaft, means on said frame for rotatably supporting said drive shaft and providing for angular movement of the latter relative to said frame to accommodate said vertical movement of said reel shaft relative to said frame, and driving connection between said drive shaft and the tractor engine.

5. A tractor mounted side delivery rake comprising in combination, a rake frame supported at least in part on the tractor, a reel shaft supported on said frame for vertical movement relative thereto, a rake reel fixed to said shaft and driven thereby, a bearing support member journaled on said shaft and movable vertically therewith, a drive shaft journaled on said bearing support member, driving connection between said drive shaft and said reel shaft, bearing means pivotally connected with said frame for supporting said drive shaft and providing for angular movement of the latter relative to said frame to accommodate said vertical movement of said reel shaft relative to said frame, and driving connection between said drive shaft and the tractor engine, including a flexible joint serially connected with the drive shaft in the proximity of said bearing means.

6. An implement comprising, in combination, a frame, a pair of ground wheels, support means connecting each of said wheels to said frame for independent vertical movement, a sheave wheel, means for moving said sheave wheel relative to said frame in a direction perpendicular to the axis of the wheel, and flexible means connected to each of said wheel support means and trained over said sheave wheel whereby movement of the latter in one direction causes an equal force to be exerted on each of said wheel support means to raise said frame relative to the wheels.

7. An implement comprising, in combination, a frame, a pair of ground wheels disposed at the rear end thereof, supporting standards journaled on said wheels, means connecting said standards to said frame for independent vertical movement relative thereto, a sheave wheel movable in a fore and aft direction with respect to the frame, adjusting means on said frame for moving said sheave wheel, and a flexible tension member connected at opposite ends thereof to both of said wheel support means, said tension member being trained over said sheave wheel in a manner whereby forward movement of the latter under the influence of said adjusting means causes equal force to be applied downwardly on each of said wheel support means to raise said frame relative to the wheels.

8. In an agricultural implement, the combination of a frame, a pair of ground wheels connected with said frame for independent relative vertical movement, a control member mounted on said frame and movable with respect thereto, and equalizing means interconnecting said control member with said ground wheels and operative when a force is applied to said control member to distribute the force equally to each of said wheels independent of the position of one wheel relative to the other for moving the wheels vertically with respect to the frame.

9. A side delivery rake comprising, in combination, a main frame, a rake reel supported thereon for relative vertical movement, a bearing support member journaled on the reel, a bearing pivoted on said main frame for vertical swinging movement, a rotatable drive shaft journaled in said bearing and operatively connected with the reel shaft adjacent said bearing support member, and a radius arm fixed to the bearing and to the bearing support member to relieve the drive shaft of bending stresses resulting from the torque of the rake reel.

10. In combination with a tractor having a power take-off shaft, a side delivery rake comprising a frame connected with the tractor, a rotary rake reel having a central shaft, one end of said reel shaft being swingable vertically in an arc about an axis spaced radially from the shaft, a drive shaft disposed substantially perpendicular to said reel shaft and intersecting the axis of swinging movement of said one end of the reel, a worm fixed to the drive shaft, a gear meshed with said worm and having driving connection with the reel shaft, and means connecting said drive shaft with said power take-off shaft including a flexible joint disposed closely adjacent said intersection of the drive shaft with the axis of movement of the reel shaft.

FRANK D. JONES.
MARCUS E. McCLELLAN.